United States Patent
Cai et al.

(10) Patent No.: US 8,711,853 B2
(45) Date of Patent: Apr. 29, 2014

(54) SYSTEM AND METHOD FOR PROVIDING A PATH AVOIDANCE FEATURE IN A NETWORK ENVIRONMENT

(75) Inventors: Yiqun Cai, Cupertino, CA (US); Heidi Ou, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 428 days.

(21) Appl. No.: 12/823,753

(22) Filed: Jun. 25, 2010

(65) Prior Publication Data

US 2011/0317695 A1 Dec. 29, 2011

(51) Int. Cl.
*H04L 12/28* (2006.01)

(52) U.S. Cl.
USPC .......................................... 370/390

(58) Field of Classification Search
None
See application file for complete search history.

(56) References Cited

U.S. PATENT DOCUMENTS

| | | | |
|---|---|---|---|
| 6,256,295 B1 * | 7/2001 | Callon | 370/254 |
| 7,903,557 B1 * | 3/2011 | Colloff et al. | 370/231 |
| 2011/0075663 A1 * | 3/2011 | Serbest | 370/390 |
| 2011/0235638 A1 * | 9/2011 | Tempia Bonda | 370/390 |

FOREIGN PATENT DOCUMENTS

WO WO 2010063298 A1 * 6/2010

OTHER PUBLICATIONS

"Load Splitting IP Multicast Traffic over ECMP", Cisco Systems, Inc., Feb. 27, 2007. Accessed on Mar. 19, 2012 at: http://www.cisco.com/en/US/docs/ios/12_4t/ip_mcast/configuration/guide/mctlsplt.pdf.*
Cisco Systems, Inc., "Internet Protocol (IP) Multicast: Technology Overview," © 2000, 15 pages; http://www.cisco.com/warp/public/cc/pd/iosw/prodlit/ipimt_ov.pdf.
Cisco, "IP Networks for Broadcaster Applications," retrieved and printed on Jun. 25, 2010, 26 pages; https://www.cisco.com/en/US/solutions/ns341/ns898/ip_networks_for_broadcaster_applications.pdf.

\* cited by examiner

*Primary Examiner* — Dang Ton
*Assistant Examiner* — Ronald H Davis
(74) *Attorney, Agent, or Firm* — Patent Capital Group

(57) ABSTRACT

A method is provided in one example and includes evaluating multiple paths in a network in order to execute a reverse path forwarding decision for multicast traffic associated with a source. The method may also include selecting a second network path based on a first network path previously been designated as a route for the multicast traffic associated with the source. The first network path and a second network path differ by at least one network element. The method further includes receiving at least one of a first data stream and a second data stream, wherein the first data stream is associated with the first network path and the second data stream is associated with the second network path.

20 Claims, 6 Drawing Sheets

SYSTEM AND METHOD FOR PROVIDING A PATH AVOIDANCE FEATURE IN A NETWORK ENVIRONMENT

TECHNICAL FIELD

This disclosure relates in general to the field of communications and, more particularly, to providing a path avoidance feature in a network environment

BACKGROUND

Networking architectures have grown increasingly complex in communication environments. As the subscriber base of end users increases, proper routing and efficient management of communication sessions and data flows becomes critical. Internet Protocol (IP) communications generally provide different types of communication methods across a network (e.g., unicast and multicast). Unicast is a method of point-to-point communication, and it is typically used when two nodes need to exchange data, where neither node is concerned with sharing the data with multiple hosts. Multicast communications can allow a group of hosts to receive messages without broadcasting those messages to all of the hosts in the broadcast domain. The ability to minimize packet loss or disruptions in the network presents a significant challenge to component manufacturers, network operators, and service providers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example and includes evaluating multiple paths in a network in order to execute a reverse path forwarding decision for multicast traffic associated with a source. The method may also include selecting a second network path based on a first network path previously been designated as a route for the multicast traffic associated with the source. The first network path and a second network path differ by at least one network element. The method further includes receiving at least one of a first data stream and a second data stream, wherein the first data stream is associated with the first network path and the second data stream is associated with the second network path.

In more particular embodiments, a loadbalancing operation is performed as part of the selecting of the second network path. In other embodiments, a reverse path forwarding interface and a reverse path forwarding neighbor are identified in response to receiving a request to join the source. Subsequent selections of network paths include favoring a particular network path having different reverse path forwarding neighbors in comparison to network paths having similar reverse path forwarding neighbors. The selecting of the second network path can include executing a hash algorithm to construct a forwarding tree for routing packets in the network. The selecting of the second network path is further based on evaluating routing entries associated with source data and group data for the multicast traffic. In more detailed embodiments, the method can also include executing a protocol-independent multicast (PIM) protocol in which a path avoidance attribute is included in a join message to be sent to a neighboring network element. The path avoidance attribute identifies the first network path previously designated as the route for the multicast traffic associated with the source.

Example Embodiments

Figure 1:
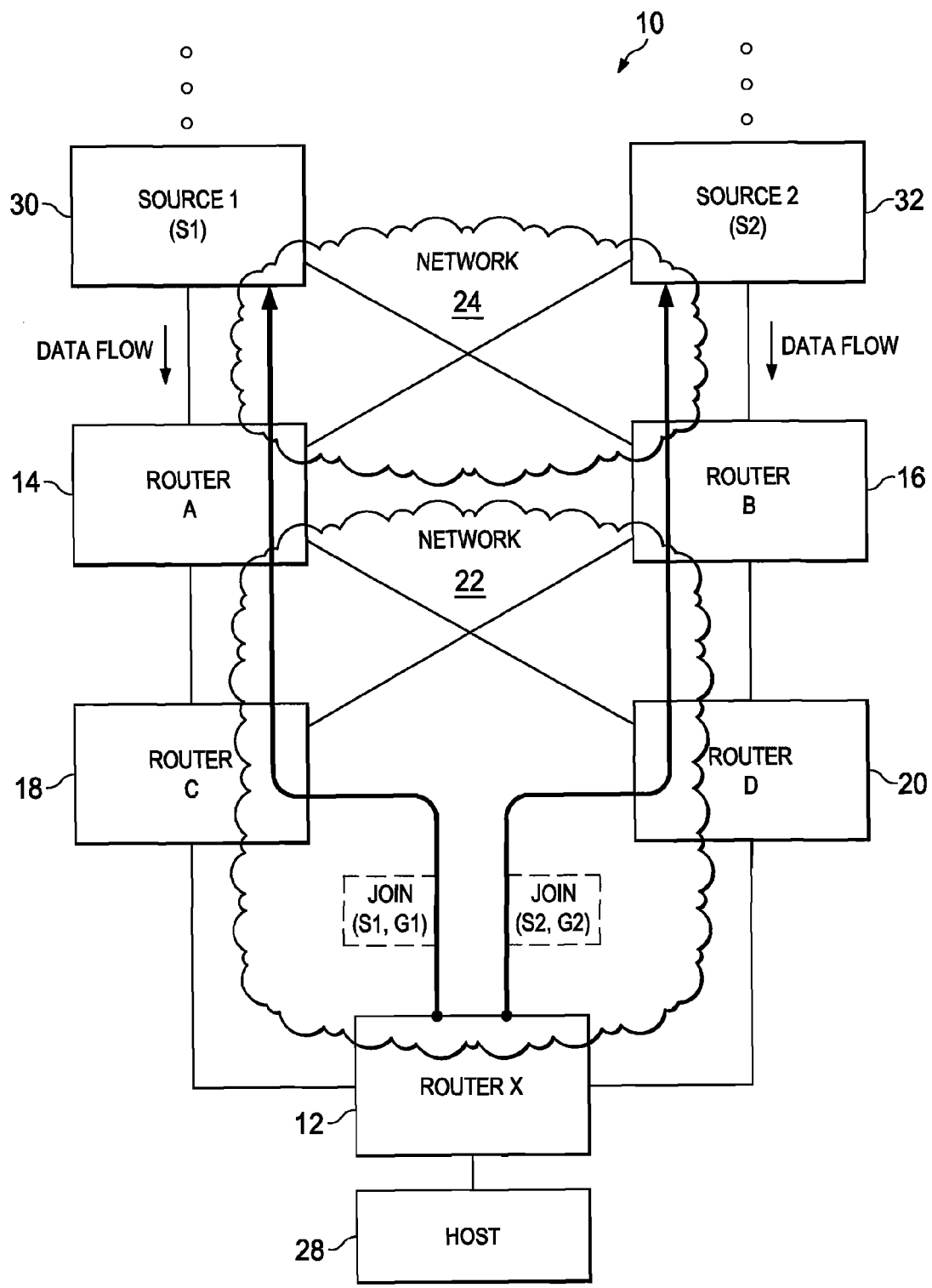
FIG. 1 is a simplified block diagram of a communication system for providing a path avoidance feature in a network environment in accordance with one embodiment of the present disclosure.

Turning to FIG. 1, FIG. 1 is a simplified block diagram of a communication system 10 for offering path avoidance for forwarding trees in a network environment. FIG. 1 includes a router X 12, which is coupled to a host 28. Also provided in FIG. 1 is a set of routers 14, 16, 18, 20 that are labeled A-D respectively. Routers A-D can achieve suitable connectivity via networks 22, 24. Several sources 30 and 32 (i.e., labeled as source 1 (S1) and source 2 (S2)) can offer suitable content to a requesting endpoint, where data can flow back to host 28 as is illustrated in FIG. 1 by a set of arrows. Note that join messages are typically sent from host 28 to sources 30 and 32, whereas the data flow (i.e., the content) can propagate in the opposite direction. This allows reverse path forwarding to be implemented in environments such as those depicted by FIG. 1.

In one particular instance, communication system 10 can be associated with a service provider digital subscriber line (DSL) deployment. In other examples, communication system 10 would be equally applicable to other communication environments, such as an enterprise wide area network (WAN) deployment, cable scenarios, broadband generally, fixed wireless instances, fiber to the x (FTTx), which is a generic term for any broadband network architecture that uses optical fiber in last-mile architectures. Communication system 10 may include a configuration capable of transmission control protocol/internet protocol (TCP/IP) communications for the transmission and/or reception of packets in a network. Communication system 10 may also operate in conjunction with a user datagram protocol/IP (UDP/IP) or any other suitable protocol, where appropriate and based on particular needs.

For purposes of illustrating certain example techniques of communication system 10, it is important to understand the communications that may be traversing the network. The following foundational information may be viewed as a basis from which the present disclosure may be properly explained. Typically, multicast is the preferred method of communication for network distribution applications. Multicast is a bandwidth-conserving technology that reduces traffic by simultaneously delivering data to multiple hosts. Multicast leverages the concept of a group. A multicast group is an arbitrary group (G) of receivers that express an interest in receiving a particular data stream from a source (S). Hence, any multicast transmission has a multicast group address, G. A multicast group can have more than one source, and each such source can also have a regular (class A, B, and C) internet address (S). The notation (*, G) generally means every possible source for a given group G, while (S, G) means a particular source, at a particular Internet address S, in the group G. A host seeking to receive data sent to a multicast group can join the group using, for example, Internet Management Group Protocol (IGMP). Hosts that are members of a given multicast group can receive data sent to that multicast group.

IGMP is a protocol used by hosts and by multicast-enabled routers to form (and to manage) a multicast group. To join a group, a host typically sends an IGMP membership report to a local multicast router. The membership report can indicate (to the local multicast router) that the host is interested in joining a particular multicast group. The address of the multicast group is often included in the membership report. The router, recognizing that the host wishes to join the group, establishes a path form the source to the host, and then forwards data to the host accordingly.

Protocol-independent multicast (PIM) gets its name from the fact that it is IP routing protocol-independent. PIM can leverage the unicast routing protocols being used to populate the unicast routing table. PIM uses this unicast routing information to perform the multicast forwarding function and, thereby, makes the mechanism protocol-independent. Although PIM is called a multicast routing protocol, it can use the unicast routing table to perform the reverse path forwarding (RPF) check function, instead of building a completely independent multicast routing table.

In unicast routing, traffic is routed through the network along a single path from the source to the destination host. A unicast router is indifferent to the source address; it only evaluates the destination address and how to forward the traffic toward that destination. The router typically scans through its routing table, and then forwards a single copy of the unicast packet out of the correct interface in the direction of the destination. In multicast routing, the source is sending traffic to an arbitrary group of hosts represented by a multicast group address. The multicast router determines which direction is upstream (toward the source) and which direction (or directions) is downstream. If there are multiple downstream paths, the router replicates the packet and forwards the traffic down the appropriate downstream paths. This concept of identifying the path to reach the source, in order to get the traffic from the source via the same path, is known as reverse path forwarding (RPF). RPF is a fundamental concept in multicast routing that enables routers to correctly forward multicast traffic down the distribution tree. RPF makes use of the existing unicast routing table to determine the upstream and downstream neighbors. A router can forward a multicast packet when it is received on the upstream interface.

Multiprotocol Border Gateway Protocol (MBGP) offers a method for service providers to distinguish which route prefixes should be used for performing multicast RPF checks. The RPF check is the mechanism that routers can use to determine the paths that multicast forwarding trees follow for successfully delivering multicast packets from sources to receivers.

The term Live-Live (also referred to as Hot-Hot) offers a method of sending redundant data streams through the network using path separation and dedicated infrastructure. For example, an A copy of the streams would be sent to one set of multicast groups and a B set of streams would be sent using a second set of multicast groups. Each of these groups will theoretically be delivered using a parallel, but a separate, set of equipment to the end user with physical path separation.

One of the main justifications for deploying the Live-Live protocol is the optimistic view that packets in the data stream (to be received by the host) are never lost. When Live-Live is implemented with full physical path separation and with redundant server infrastructure for the A and B streams, it can provide resiliency for a failure in a server, a router, or a link in the network. Live-Live can also be implemented in a converged network (no physical path separation), and there will still be resiliency for the servers, but not necessarily for a network failure. A further enhancement for providing highly available multicast services is Multicast-only Fast Re-Route (MoFRR).

Live-live has often been espoused as a solution that (in theory) achieves zero loss of IP multicast packets for networks that support video, market data, and other applications. Typically, a network system that supports the Live-Live protocol contains the following elements. The first element is a source or (multiple sources) capable of generating two IP packet flows for the same content stream. These two flows are distinguishable by the network (IP) headers (i.e., the source, the destination, or both addresses are different). The second element of the system is a receiver, which is capable of signaling to join both flows and to discard the duplicate packets using information in the transport headers. The third element of the system is a network that is capable of routing the two flows onto different, non-overlapping paths so that a single failure in the network can cause potential packet loss for (at most) one of the flows: resulting in a zero loss for the content stream.

Live-Live transport networks have been deployed using multi-topology (MT) capable interior gateway protocols (IGPs). In such implementations, there can be several limitations of an MT-based solution. For example, it is not trivial to configure MT-IGP, especially if the topology selector is the source addresses of the streams. Additionally, there are potential interoperability issues when certain devices are deployed. It should also be noted that, in many cases, the source addresses are not part of the MT-IGP domain of the transport network. In many cases, this requires the use of a BGP (or the equivalent external routing mechanisms) to be deployed and to interwork with MT-IGP, which further increases the complexity (and therefore the resilience) of the network.

In accordance with one example implementation, communication system 10 can resolve the aforementioned issues associated with deficient forwarding protocols. More specifically, communication system 10 can allow a transport network to continue to support Live-Live without deploying MT-IGP. In operation, a given RPF check process can consider not only the IGP metric, but also any potential exclusionary mroutes. Additionally, an enhancement to PIM can be provisioned in order to encode the path avoidance attribute, which can be signaled to the upstream routers. Note that embodiments of communication system 10 can offer modest modifications to PIM only, where the modification can be deployed incrementally by service providers. Furthermore, such a change can be independent of the IGP to be used. Therefore, such a solution could be used with IS-IS, OSPF, EIGRP, etc., in addition to MT capable IGPs. This would allow, for example, communication system 10 to be deployed in a much wider range of networks. Note that certain modifications do not necessarily affect how the reachability to the sources would be learned by the routers.

Figure 2:
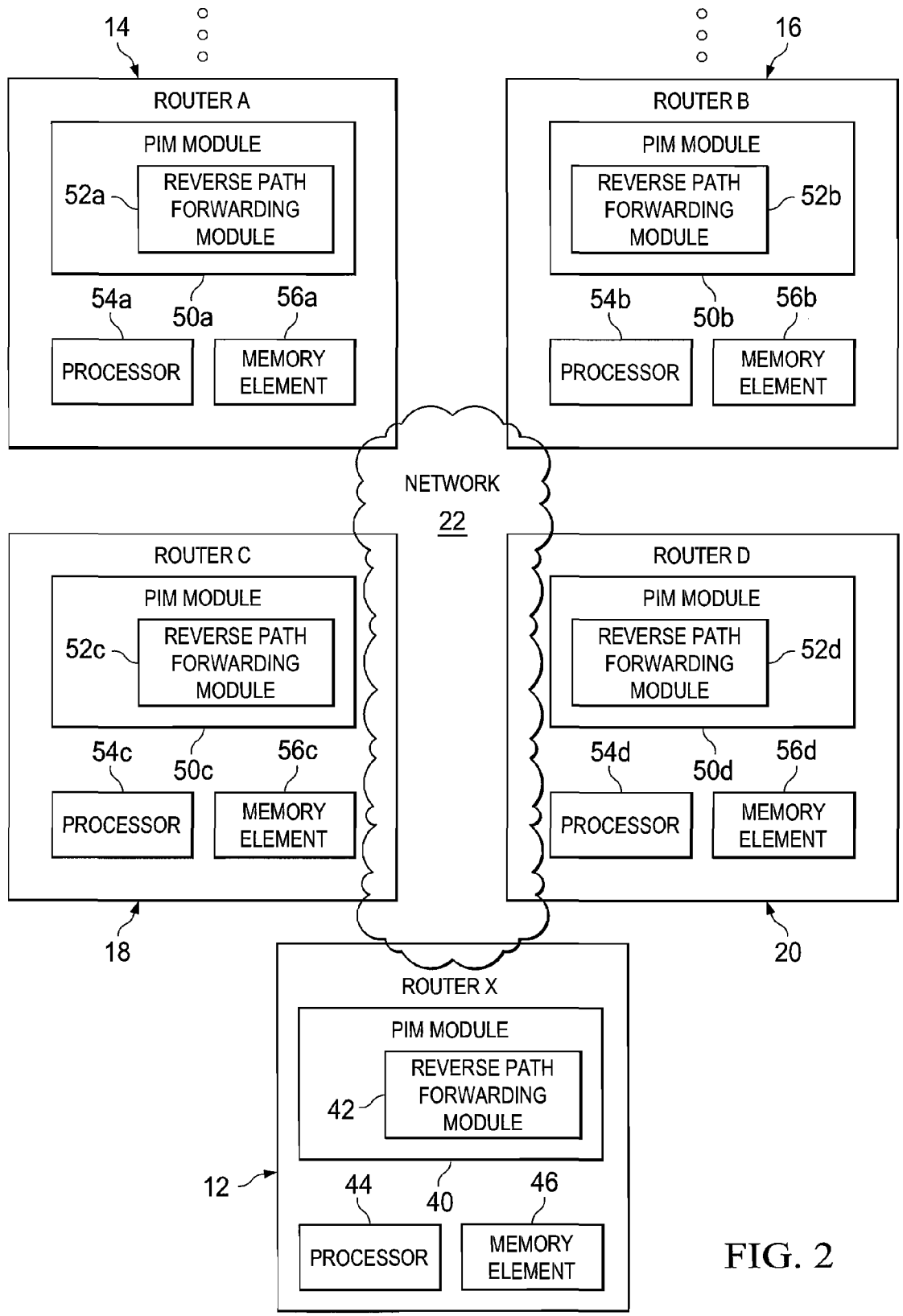
FIG. 2 is a simplified block diagram illustrating possible example details associated with the communication system.

Turning to FIG. 2, FIG. 2 is a simplified block diagram illustrating one possible set of details associated with communication system 10. Routers 14, 16, 18, and 20 can include a respective processor 54*a-d*, a respective memory element 56*a-d*, and a respective PIM module 50*a-d*, which can include a respective reverse path forwarding module 52*a-d*. Additionally, in certain embodiments, only router X is provided with these enhancements such that it would include similar infrastructure. In a particular example of FIG. 2, router X also includes PIM module 40, a reverse path forwarding module 42, a processor 44, and a memory element 46. The memory elements can store any appropriate information (e.g., routing tables, entries, network configurations, policies, forwarding trees, etc.). Before discussing potential flows associated with the architectures of FIG. 1-2, a brief discussion is provided about some of the possible infrastructure that may be included in communication system 10.

Host 28 can be associated with clients, customers, or end users wishing to initiate a communication in communication system 10 via some network. The term 'host' is inclusive of devices used to initiate a communication, such as a receiver, a computer, a set-top box, an IRD, or any other device, component, element, or object capable of initiating voice, audio, video, media, or data exchanges within communication system 10. Host 28 may also be inclusive of a suitable interface to the human user, such as a display, a keyboard, a touchpad, a remote control, or other terminal equipment. Host 28 may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another.

Networks 22 and 24 represent a series of points or nodes of interconnected communication paths for receiving and transmitting packets of information that propagate through communication system 10. Networks 22 and 24 offer a communicative interface between sources and/or hosts, and may be any local area network (LAN), wireless local area network (WLAN), metropolitan area network (MAN), Intranet, Extranet, WAN, virtual private network (VPN), or any other appropriate architecture or system that facilitates communications in a network environment. Networks 22 and 24 may implement a UDP/IP connection and use a TCP/IP communication language protocol in particular embodiments of the present disclosure. However, IP network 18 may alternatively implement any other suitable communication protocol for transmitting and receiving data packets within communication system 10.

Routers 12, 14, 16, 18, and 20 are network elements that facilitate multicast flows between hosts and/or sources in a given network (e.g., for networks such as those illustrated in FIGS. 1-2). As used herein in this Specification, the term 'network element' is meant to encompass routers, switches, gateways, bridges, loadbalancers, firewalls, inline service nodes, proxies, servers, processors, modules, or any other suitable device, component, element, proprietary appliance, or object operable to exchange information in a network environment. This network element may include any suitable hardware, software, components, modules, interfaces, or objects that facilitate the operations thereof. This may be inclusive of appropriate algorithms and communication protocols that allow for the effective exchange of data or information.

In one implementation, routers 12, 14, 16, 18, and/or 20 include software to achieve (or to foster) the forwarding determinations, as outlined herein in this Specification. Note that in one example, each of these elements can have an internal structure (e.g., a processor, a memory element, etc.) to facilitate some of the operations described herein. In other embodiments, these forwarding determinations may be executed externally to these elements, or included in some other network element to achieve this intended functionality. Alternatively, routers 12, 14, 16, 18, and/or 20 may include this software (or reciprocating software) that can coordinate with other network elements in order to achieve the operations, as outlined herein. In still other embodiments, one or several devices may include any suitable algorithms, hardware, software, components, modules, interfaces, or objects that facilitate the operations thereof.

In operational terms, and in terms of one particular embodiment, if the source performing the Live-Live protocol executes PIM, the path diversity decision can be made directly from the source. If the path diversity is driven from the receivers, either the receivers could execute PIM and, further, issue join messages on multiple upstream interfaces. If the receivers only employ IGMP, the path diversity information can be added to IGMP using a mechanism such as that which is described with reference to PIM.

In operation of an example flow, when a given router performs an RPF lookup for an mroute entry (e.g., (S1, G1)), it takes into consideration the identity of another mroute entry (e.g., (S2, G2)). More specifically, this consideration is done in such a way that the router attempts to use different RPF paths for these two mroute entries. It should be noted that when resolving the RPF information for (S1, G1), (S2, G2) does not have to be present on the router.

From an operational perspective, there are two parts to the optimal forwarding determination. The first part implicates a modification to the RPF procedure, and the second part includes an enhancement to PIM, which can signal the two mutually exclusive (S, G) opportunities. Turning first to the RPF lookup, when a router performs a routine RPF lookup for (S1, G1), it executes a hash algorithm to select (among the multiple available paths) one path for (S1, G1) to build a forwarding tree. The hash algorithm (without the features of the present disclosure) would not ensure that the two Live-Live streams (S1, G1)/(S2, G2) are routed onto different paths.

Assuming the availability of multiple paths, P1, P2 . . . Pk, these paths would be available for the purpose of RPF. When performing a RPF lookup for (S1, G1), if the multicast state exists for (S2, G2), the RPF interface and RPF neighbor is obtained. If path Px is the resultant, then the RPF loadbalancing algorithm can be executed for (S1, G1), where a subsequent comparison can be made between the resulting path Py and Px. If both the RPF interface and the RPF neighbor are different, then Py can be used. If the RPF interface is the same, but the RPF neighbor is different, or if both are the same, then the router attempts to identify the next path satisfying the above conditions. If no path can be found, the router can favor the path with different RPF neighbors. If this is not possible, then the same path can be used. If Px does not exist, the router can simply execute the loadbalancing algorithm for (S1, G1) and use the results. In the event of an IGP change, as long as the path is still available, this forwarding information can be kept for use by the router.

In regards to part two and the signaling plane, in order to support the aforementioned operations, appropriate signaling should be used. The signaling can be employed such that a router can identify that (S1, G1) and (S2, G2) should be routed in a mutually exclusive manner. This particular result could be achieved using various mechanisms: three of which are detailed below as non-limiting examples.

In a first embodiment, an enhancement is made to the PIM protocol such that when a router sends a join message for (S1, G1), it includes a join attribute (i.e., identified as the path avoidance attribute). The attribute can encode (S2, G2) to assist its upstream router in executing routing decisions. Similarly, if the router sends a PIM join for (S2, G2), it would add/encode (S1, G1) in the path avoidance attribute. Using a PIM attribute can allow the best compromise between configuration (which can be deployed at the last hop router) and state maintenance (which could affect the routers participating in the tree building).

In a second embodiment, a static configuration is used. The routers in the network can be configured in such a way that they know that (S1, G1) and (S2, G2) should be treated differently. This configuration can be done as a source prefix, a group prefix, or both. In a third embodiment, a new protocol is used. If a new protocol were used, a router in the network can process and maintain the network states. Therefore, the mechanism would not necessarily announce the exclusion on a per-pair (S, G) level.

Figure 3:
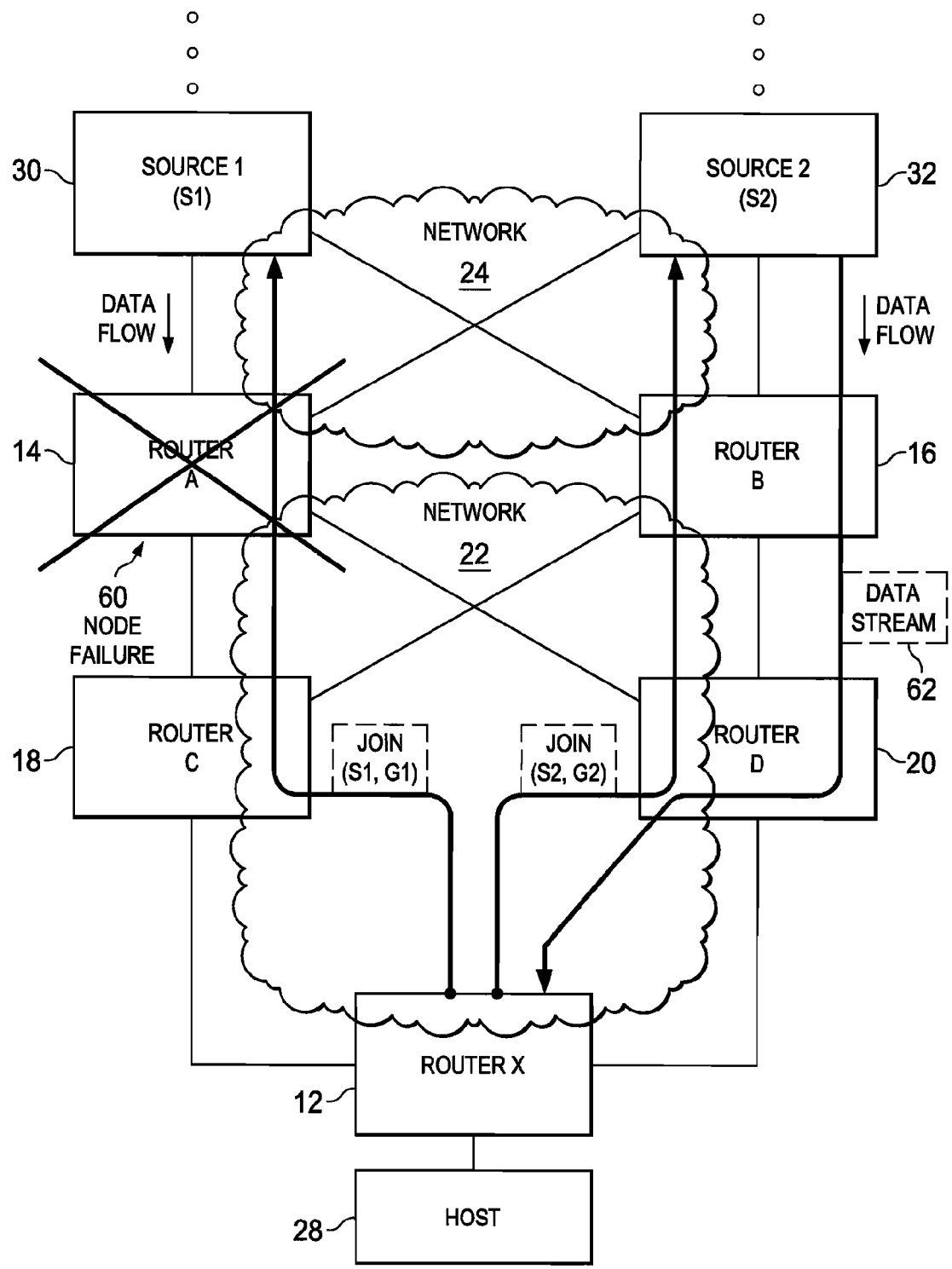
FIG. 3 is another simplified block diagram illustrating one potential operation associated with the present disclosure.

FIG. 3 is a simplified block diagram illustrating one potential operation associated with the present disclosure. In the implementation of FIG. 3, router X 12 makes a decision about which path to take to arrive at a particular source. Each router A-D has two different paths to S1 and S2 in this implementation. In this particular example, a node failure 60 is illustrated at router A. S1 and S2 are multi-homed to routers A and B. Initially, router X sends a join message to S1 and S2, where this join message can be received by upstream routers. Router X chooses router C to join (S1, G1) and chooses router D to join (S2, G2). Subsequently, router C chooses router A to join S1, while router D chooses router B to join S2. Node failure 60 does not create a forwarding path problem because a single failure to router A (or to routers B, C, D) or a disruption on any other link still allows at least one data stream to successfully reach router X. In this particular example, node failure 60 is offset by a different path originating at source two, which offers a viable data stream 62 for router X to forward on to its host. [Note that the term 'failure' as used herein encompasses any type of dysfunction, reload, error, software or hardware problem, outage, break in connectivity, etc. in which a particular node, a network, or a link is no longer available for routing purposes.]

Figure 4:
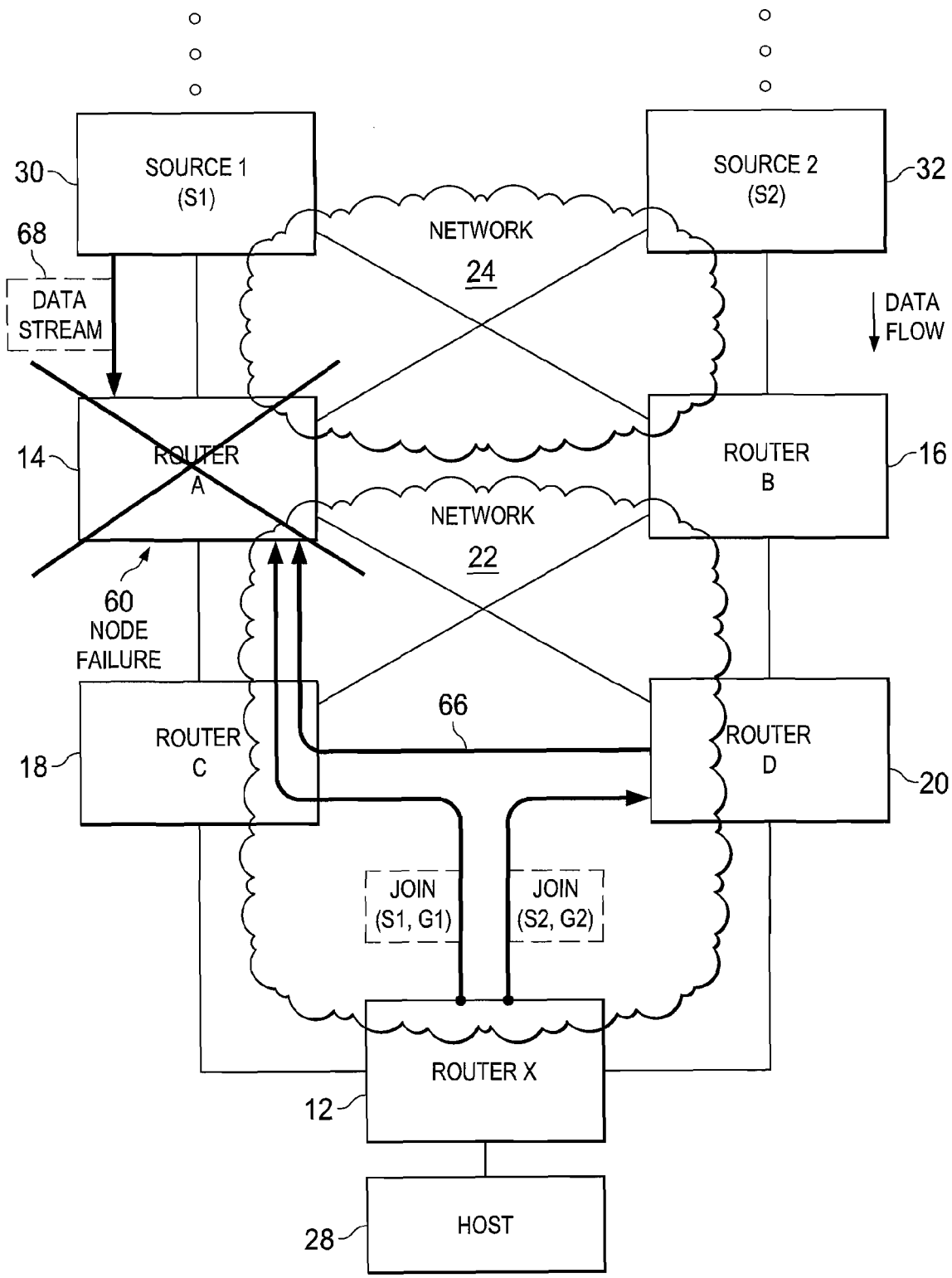
FIG. 4 is another simplified block diagram illustrating one potential operation associated with the present disclosure.

FIG. 4 is a simplified block diagram illustrating another potential operation associated with the present disclosure. FIG. 4 offers limited node redundancy in this particular implementation. Note also that FIG. 4 makes the same forwarding decisions, as discussed with reference to FIG. 3 with the exception of router D choosing router A to join S2. This forwarding decision is reflected by a link 66. A problem is encountered during a failure at router A, where a data stream 68 cannot ultimately reach router X. The failure of router A disrupts both (S1, G1) and (S2, G2), which disrupts two flows and causes a loss of data for the requesting host. This could, for example, result in an individual missing a portion of a video being watched.

Figure 5:
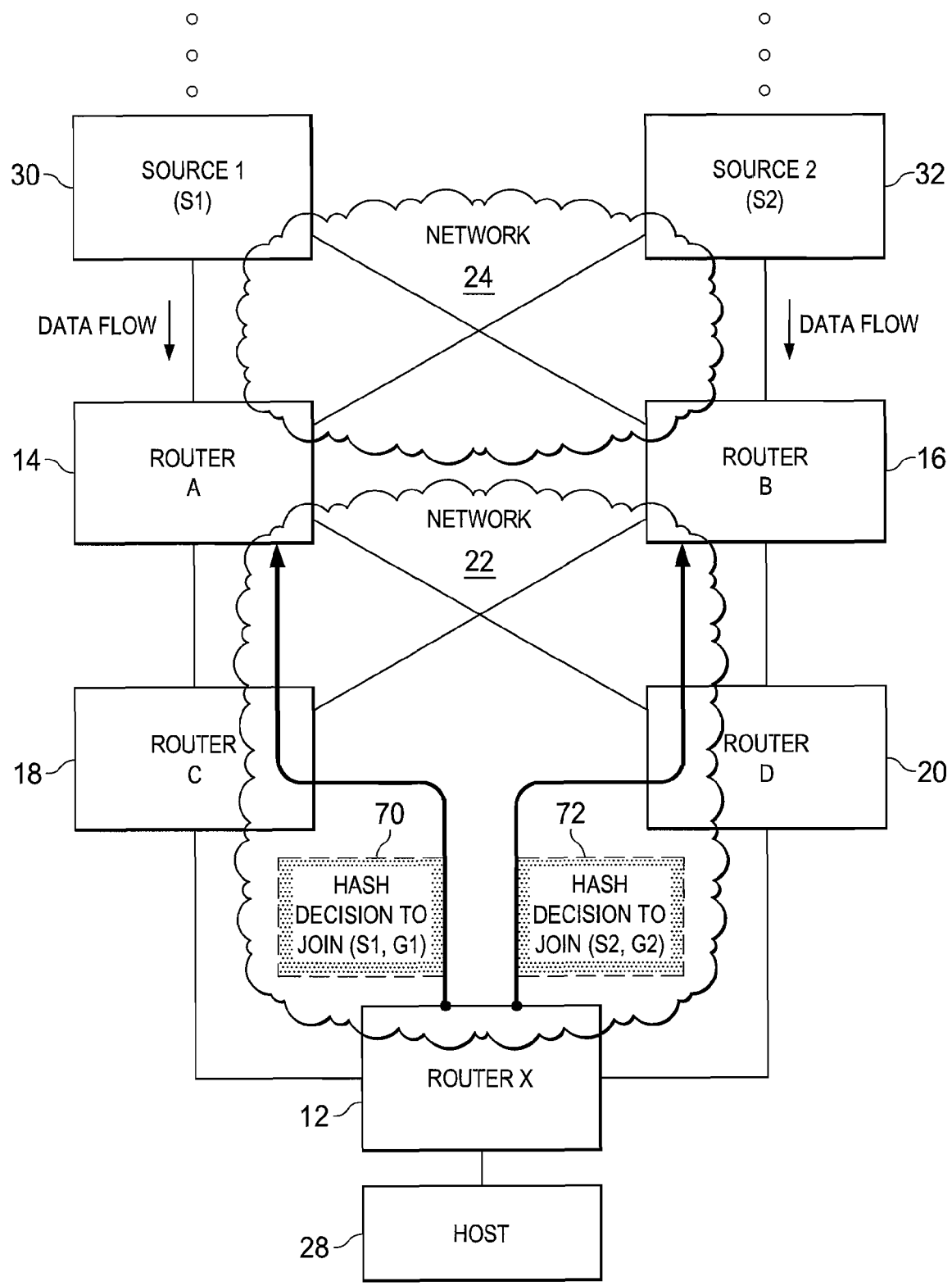
FIG. 5 is another simplified block diagram illustrating one potential operation associated with the present disclosure.

FIG. 5 is a simplified block diagram illustrating another potential operation associated with the present disclosure. FIG. 5 includes the same network topology, as previously discussed with reference to FIGS. 3-4. If router C and router D have the same set of links/next-hop routers in the network, the single point of failure might be avoided if router C and router D execute the hash algorithm first. FIG. 5 includes a hash decision to join (S1, G1) 70, and a hash decision to join (S2, G2) 72. Note that once the hashing operation indicates that (S1, G1) should choose router A, router B will be chosen for (S2, G2). Hence, node redundancy is possible, but this is dependent on the current network topology.

In general terms, and in the context of the generic RPF protocol, there is one criteria used by router X in determining how to reach to a source. Instead of evaluating a single source (or a single stream) when a given router performs RPF operations, multiple streams are considered together in accordance with the teachings of the present disclosure. Hence, when a join message is sent, the router is not simply considering how to reach that particular source, but it is also considering the other links that should be avoided. Example embodiments may include reverse path forwarding module 42 offering a mechanism for intelligently determining how to join the sources, as it considers more than one criteria in making such determinations.

Note that depending on the inherent topology of the network, certain routers may need to be upgraded (e.g., with the modules of FIG. 2), whereas other routers having a natural path separation may not have a disruption issue to be addressed. Furthermore, such enhancements to the network may be based on targeted areas of redundancy. For example, a system can target redundancy at router X (where a single hub would be protected and/or all the links connected to the hub would be similarly protected), or at any of the other routers illustrated in FIGS. 3-5.

Figure 6:
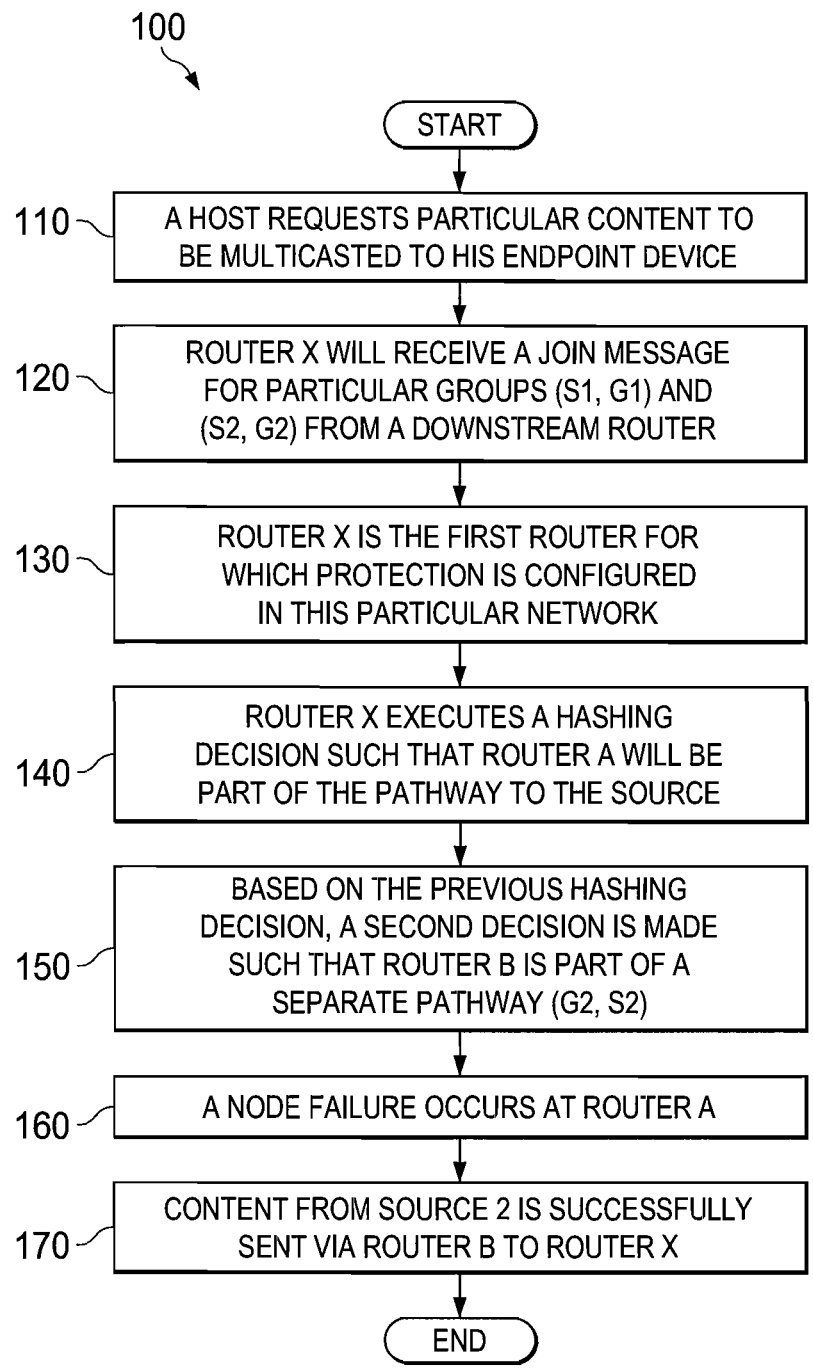
FIG. 6 is a simplified flowchart illustrating potential operations associated with the communication system.

FIG. 6 is a simplified flowchart 100 illustrating one potential operation associated with the present disclosure. The flow may begin at step 110, where an individual (i.e., a host) has requested particular content to be multicasted to his endpoint device. For example, the individual may be seeking to receive multimedia data from ESPN (e.g., a soccer game). In this particular instance, router X can receive a join message for particular groups (S1, G1) and (S2, G2) from a downstream router at step 120. Router X is the first router for which protection is configured in this particular network, as depicted by step 130.

At step 140, router X executes a hashing decision such that router A will be part of the pathway to the source. Based on that hashing decision, a second decision is made such that router B is part of a separate pathway (S2, G2). This is reflected by step 150, where additional flow information is incorporated into this particular decision. Hence, in order to achieve redundancy, a first flow does not follow a path that is shared by flow two. Without making this intelligent decision, it is entirely possible that these two flows would collide at a single point of failure. This would result in unreliable data transmissions for router X because packet loss would occur for both flows, and the host would not receive the requested content. At step 160, a node failure occurs at router A. At step 170, content from source two is successfully sent via router B to router X. Hence, a node failure has not caused a disruption to the host, who originally requested the content.

Note that in certain example implementations, the forwarding determination functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIG. 2] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in FIG. 2] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

In one example implementation, routers 12, 14, 16, 18, and/or 20 may include software in order to achieve the forwarding determination functions outlined herein. These activities can be facilitated by PIM modules 40, 50a-d and/or reverse path forwarding modules 42, 52a-d (where these modules can be suitably combined in any appropriate manner, which may be based on particular configuration and/or provisioning needs). Routers 12, 14, 16, 18, and/or 20 can include memory elements for storing information to be used in achieving the intelligent forwarding determination activities, as discussed herein. Additionally, routers 12, 14, 16, 18, and/or 20 may include a processor that can execute software or an algorithm to perform the forwarding determination operations, as disclosed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., database, tables, trees, cache, etc.) should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in the preceding flow diagrams illustrate only some of the possible signaling scenarios and patterns that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain endpoint components and certain protocols (e.g., IGP, IGMP, etc.), communication system 10 may be applicable to other protocols and arrangements. Moreover, the present disclosure is equally applicable to various technologies, aside from DSL architectures, as these have only been offered for purposes of discussion. Along similar lines, communication system 10 can be extended to any Multi-Protocol Label Switching (MPLS) architecture. Similarly, the teachings presented herein can also be used in loop free alternate (LFA) configurations in other embodiments.

Note also that certain embodiments of communication system 10 are not necessarily intended to replace MT-IGP in a Live-Live environment. Certain embodiments may be viewed as a simpler alternative in certain cases where MT-IGP is not a requirement. For example, a Live-Live network can be implemented using multiple IGP processes. In this fashion, the network has a natural separation of paths (which is similar to assumptions in MoFRR). The teachings of the present disclosure can be used at the ingress and egress edges of such a network to take advantage of the existing diverse paths offered by unicast. This may eliminate the need to configure VPN routing/forwarding instances (VRFs)/topology/path selection policies at the edge routers, which is also applicable when MT-IGP is being used.

Another application of communication system 10 can implicate networks that only require diverse path forwarding within one or two hops. Such types of networks usually have several high bandwidth optical rings in the core, where the requirement is to split Live-Live streams onto different rings. For example, certain television service providers could employ this type of requirement, and such a system could readily employ the teachings of the present disclosure. Additionally, although communication system 10 has been illustrated with reference to particular elements and operations that facilitate the communication process, these elements and operations may be replaced by any suitable architecture or process that achieves the intended functionality of communication system 10.

What is claimed is:

1. A method, comprising:
    evaluating multiple paths in a network in order to execute a reverse path forwarding decision for multicast traffic associated with a source;
    selecting a second network path based on a first network path previously having been designated as a route for the multicast traffic associated with the source, wherein the first network path and the second network path differ by at least one network element;
    sending a join message for the second network path including a path avoidance attribute associated with the first network path to a neighboring network element, wherein the path avoidance attribute identifies the first network path as the previously designated route for the multicast traffic associated with the source; and
    receiving at least one of a first data stream and a second data stream, wherein the first data stream is associated with the first network path and the second data stream is associated with the second network path.

2. The method of claim 1, wherein a loadbalancing operation is performed as part of the selecting of the second network path.

3. The method of claim 1, wherein a reverse path forwarding interface and a reverse path forwarding neighbor are identified in response to receiving a request to join the source.

4. The method of claim 1, wherein selections of network paths subsequent to the selecting of the second network path include selecting a particular network path having different reverse path forwarding neighbors in comparison to network paths having similar reverse path forwarding neighbors.

5. The method of claim 1, wherein the selecting of the second network path includes executing a hash algorithm to construct a forwarding tree for routing packets in the network.

6. The method of claim 1, wherein the selecting of the second network path is further based on evaluating routing entries associated with source data and group data for the multicast traffic.

7. The method of claim 1, further comprising:
executing a protocol-independent multicast (PIM) protocol to include the path avoidance attribute in the join message.

8. Logic encoded in one or more non-transitory tangible media that includes code for execution and when executed by a processor operable to perform operations comprising:
evaluating multiple paths in a network in order to execute a reverse path forwarding decision for multicast traffic associated with a source;
selecting a second network path based on a first network path previously having been designated as a route for the multicast traffic associated with the source, wherein the first network path and the second network path differ by at least one network element;
sending a join message for the second network path including a path avoidance attribute associated with the first network path to a neighboring network element, wherein the path avoidance attribute identifies the first network path as the previously designated route for the multicast traffic associated with the source; and
receiving at least one of a first data stream and a second data stream, wherein the first data stream is associated with the first network path and the second data stream is associated with the second network path.

9. The logic of claim 8, wherein a loadbalancing operation is performed as part of the selecting of the second network path.

10. The logic of claim 8, wherein a reverse path forwarding interface and a reverse path forwarding neighbor are identified in response to receiving a request to join the source.

11. The logic of claim 8, wherein the selecting of the second network path includes executing a hash algorithm to construct a forwarding tree for routing packets in the network.

12. The logic of claim 8, wherein the selecting of the second network path is further based on evaluating routing entries associated with source data and group data for the multicast traffic.

13. The logic of claim 8, wherein the operations further comprises:
executing a protocol-independent multicast (PIM) protocol to include the path avoidance attribute in the join message.

14. An apparatus, comprising:
a memory element configured to store data,
a processor operable to execute instructions associated with the data, and
a reverse path forwarding module, the apparatus being configured to:
evaluate multiple paths in a network in order to execute a reverse path forwarding decision for multicast traffic associated with a source;
select a second network path based on a first network path previously having been designated as a route for the multicast traffic associated with the source, wherein the first network path and the second network path differ by at least one network element;
send a join message for the second network path including a path avoidance attribute associated with the first network path to a neighboring network element, wherein the path avoidance attribute identifies the first network path as the previously designated route for the multicast traffic associated with the source; and
receive at least one of a first data stream and a second data stream, wherein the first data stream is associated with the first network path and the second data stream is associated with the second network path.

15. The apparatus of claim 14, wherein a loadbalancing operation is performed as part of the selecting of the second network path.

16. The apparatus of claim 14, wherein a reverse path forwarding interface and a reverse path forwarding neighbor are identified in response to receiving a request to join the source.

17. The apparatus of claim 14, wherein the selecting of the second network path includes executing a hash algorithm to construct a forwarding tree for routing packets in the network.

18. The apparatus of claim 14, wherein selections of network paths subsequent to the selecting of the second network path include selecting a particular network path having different reverse path forwarding neighbors in comparison to network paths having similar reverse path forwarding neighbors.

19. The apparatus of claim 14, wherein the at least one network element is a router configured to join a multicast channel and stream data to a host in response to receiving a request for content.

20. The apparatus of claim 14, wherein the reverse path forwarding module is configured to execute a protocol-independent multicast (PIM) protocol to include the path avoidance attribute in the join message.

* * * * *